United States Patent
Fatemi et al.

(10) Patent No.: US 12,278,550 B2
(45) Date of Patent: Apr. 15, 2025

(54) STATOR ASSEMBLY OF AN ELECTRIC MOTOR WITH RETROFITTED HEAT PIPES

(71) Applicant: GM GLOBAL TECHNOLOGY OPERATIONS LLC, Detroit, MI (US)

(72) Inventors: Alireza Fatemi, Canton, MI (US); Chih-Hung Yen, Bloomfield Hills, MI (US); Farzad Samie, Franklin, MI (US); SeungHwan Keum, Northville, MI (US); Thomas W. Nehl, Shelby Township, MI (US); Xiaofeng Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 287 days.

(21) Appl. No.: 17/690,071

(22) Filed: Mar. 9, 2022

(65) Prior Publication Data
US 2023/0291281 A1    Sep. 14, 2023

(51) Int. Cl.
*H02K 9/22* (2006.01)
*H02K 1/20* (2006.01)
*H02K 9/20* (2006.01)

(52) U.S. Cl.
CPC .............. *H02K 9/20* (2013.01); *H02K 1/20* (2013.01); *H02K 9/225* (2021.01)

(58) Field of Classification Search
CPC ............ H02K 9/20; H02K 9/19; H02K 9/193; H02K 9/197; H02K 9/225; H02K 9/22; H02K 3/24; H02K 1/20; H02K 3/487; H02K 3/493; H02K 5/203

USPC .......................................... 310/54, 58, 59, 214
See application file for complete search history.

(56) References Cited

U.S. PATENT DOCUMENTS

| | | | | |
|---|---|---|---|---|
| 4,394,344 | A * | 7/1983 | Werner | F28D 15/0233 310/11 |
| 6,265,801 | B1 * | 7/2001 | Hashiba | H02K 9/225 310/156.28 |
| 11,218,050 | B2 | 1/2022 | Leong et al. | |
| 2010/0026109 | A1 * | 2/2010 | Hassett | H02K 9/225 310/64 |
| 2018/0229971 | A1 * | 8/2018 | Ranjan | B66B 7/02 |
| 2019/0350111 | A1 * | 11/2019 | Bodla | F24S 10/95 |
| 2020/0185985 | A1 * | 6/2020 | Blum | H02K 3/12 |
| 2021/0257885 | A1 * | 8/2021 | Hwang | H02K 3/24 |
| 2021/0351668 | A1 * | 11/2021 | Leiber | H02K 9/223 |
| 2023/0143600 | A1 * | 5/2023 | Saviers | H02K 9/225 310/54 |

* cited by examiner

*Primary Examiner* — Michael Andrews (57) ABSTRACT

A motor stator includes a stator core having a plurality of stator teeth on an inner diameter thereof and defining a respective plurality of slots between the plurality of stator teeth. A plurality of windings are disposed in the slots. A heat pipe network includes a plurality of evaporator portions including a hollow structure disposed in at least a portion of the plurality of slots and including an interior having a wick extending along the interior of the hollow structure. A condenser portion has an interior portion in communication with the plurality of evaporator portions and is located at an end of the stator core. The wick of each of the plurality of evaporator portions extend into the condenser portion.

20 Claims, 7 Drawing Sheets

STATOR ASSEMBLY OF AN ELECTRIC MOTOR WITH RETROFITTED HEAT PIPES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a stator assembly of an electric motor with retrofitted heat pipes.

Electric motors are commonly used in vehicle propulsion systems and in other industrial applications. Existing electric motors are in need of improved cooling characteristics of the windings and the stator core. Improved cooling of the stator can improve the efficiency of the electric motor and can improve the motor's performance.

SUMMARY

According to an aspect of the present disclosure, a motor stator includes a stator core having a plurality of stator teeth on an inner diameter thereof and defining a respective plurality of slots between the plurality of stator teeth. A plurality of windings are disposed in the slots. A heat pipe network includes a plurality of evaporator portions including a hollow structure disposed in at least a portion of the plurality of slots and including an interior having a wick extending along the interior of the hollow structure. A condenser portion has an interior portion in communication with the plurality of evaporator portions and is located at an end of the stator core. The wick of each of the plurality of evaporator portions extend into the condenser portion.

According to a further aspect, a motor stator includes a stator core having a plurality of stator teeth on an inner diameter thereof and the stator core defining a respective plurality of slots between the plurality of stator teeth. A plurality of windings are disposed in the slots, at least a portion of the plurality of windings including a hollow wire structure further defining a heat pipe network including a plurality of evaporator portions disposed in the plurality of slots and a plurality of condenser portions extending beyond the ends of the stator core. The hollow wire structure including a wick in the plurality of evaporator portions and the plurality of condenser portions. The hollow wire structure including a liquid therein.

According to a still further aspect, a motor includes a stator including a stator core having a plurality of stator teeth on an inner diameter thereof and defining a respective plurality of slots between the plurality of stator teeth. A plurality of windings are disposed in the slots. A heat pipe network includes a plurality of evaporator portions including a hollow structure disposed in the plurality of slots and including an interior having a wick extending along the interior of the hollow structure. A condenser portion includes an interior portion in communication with the plurality of evaporator portions and the condenser portion being located at an end of the stator core. The wick of each of the plurality of evaporator portions extending into the condenser portion. A rotor is rotatably mounted relative to the stator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
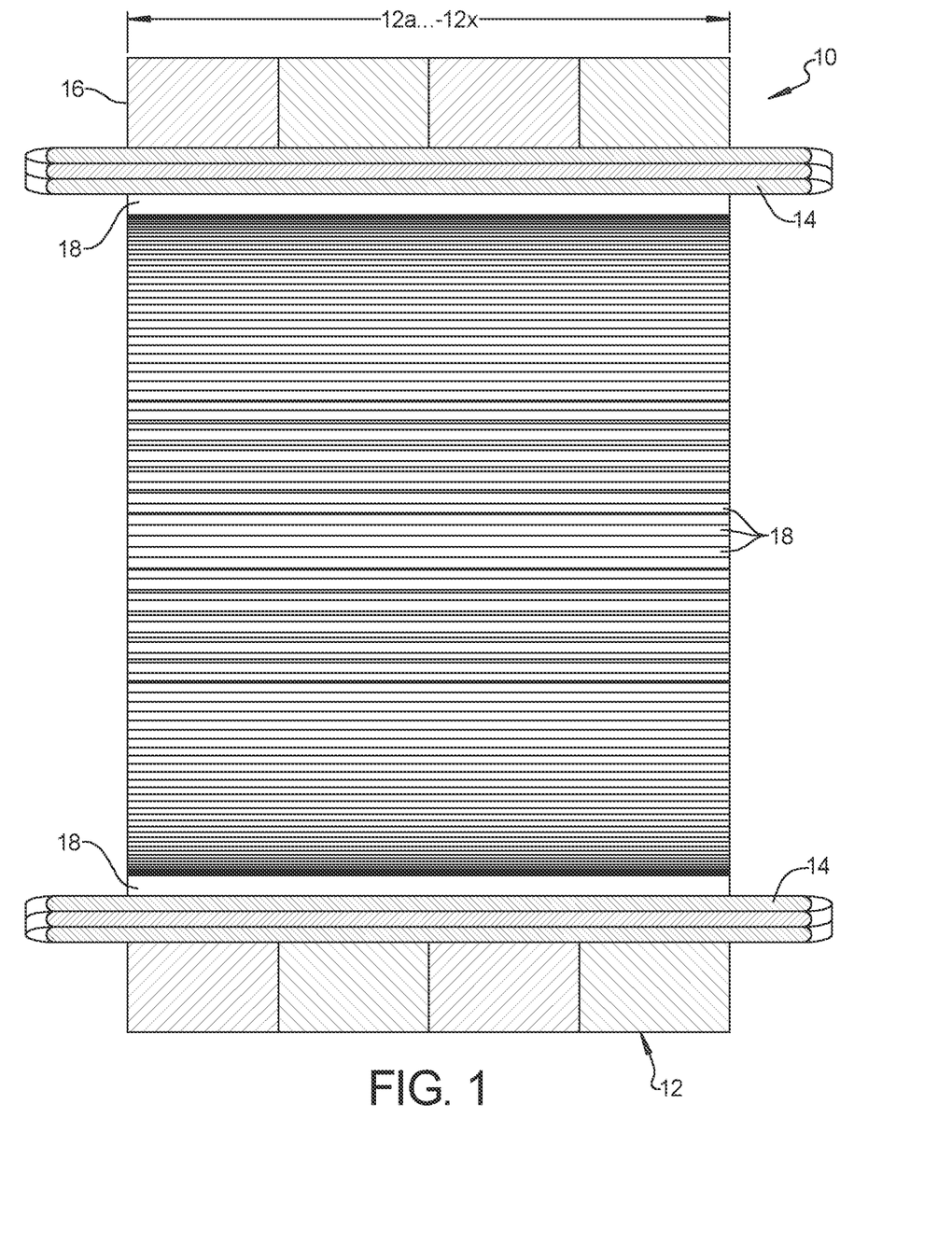
FIG. 1 is a cross-sectional view of an annular oil cooled stator according to the principles of the present disclosure.
Figure 3:
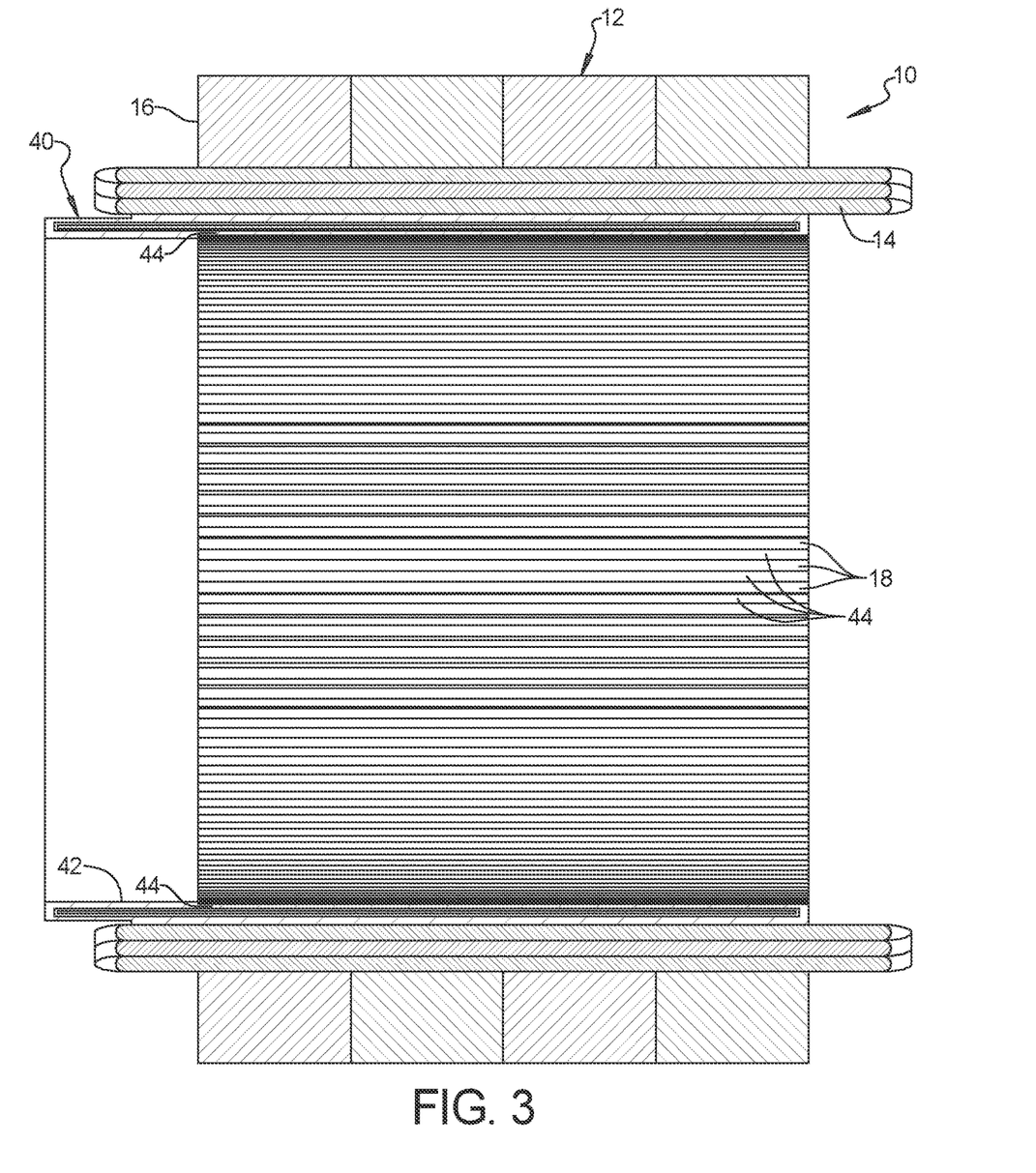
FIG. 3 is a cross-sectional view of the annular oil cooled stator with the heat pipe system of FIG. 2 mounted therein.

With reference to FIGS. 1 and 3, a stator assembly 10 according to the principles of present disclosure is shown. The stator assembly 10 includes an annular stator core 12 and a plurality of multi-phase windings 14, as is known in the art.

The annular stator core 12 can be made up of a plurality of groupings 12a . . . 12x of stamped laminates formed from sheet steel. In particular, each grouping 12a . . . 12x of stamped laminates can include a predetermined number of stamped laminates in order to provide a desired thickness to the grouping 12a . . . 12x. Without being limited by the particular example, each of the stamped laminates can be between 0.2 and 0.5 mm thick. Accordingly, in a grouping of, for example, ten (10) stamped laminates, the groupings 12a . . . 12x can have a thickness of between 2 and 5 mm dependent upon a thickness of the laminates used. By way of non-limiting example, twenty (20) groupings of laminates can be provided so that, for example, with 10 laminates in each grouping 12a . . . 12x the stator core 12 would include 200 laminates. It should be understood that because the individual laminates making up each grouping are very thin, for illustrative purposes, the individual laminates of each grouping 12a . . . 12x are not individually shown. The stator core 12 includes all of the individual laminates of each grouping 12a . . . 12x being secured together in the stacked arrangement as illustrated in FIG. 1. The individual laminates can be secured together by adhesive bonding, welding, clamping, or other techniques.

The annular stator core 12 includes a back-iron portion 16 along its outer diameter and a plurality of stator teeth 18 along its inner diameter. The different groupings of laminates 12a . . . 12x can be specifically designed to define cooling channels within the back-iron portion 16 of the stator core 12, as disclosed, for example, in commonly assigned U.S. Pat. No. 11,218,050 which is herein incorporated by reference in its entirety.

Figure 8:
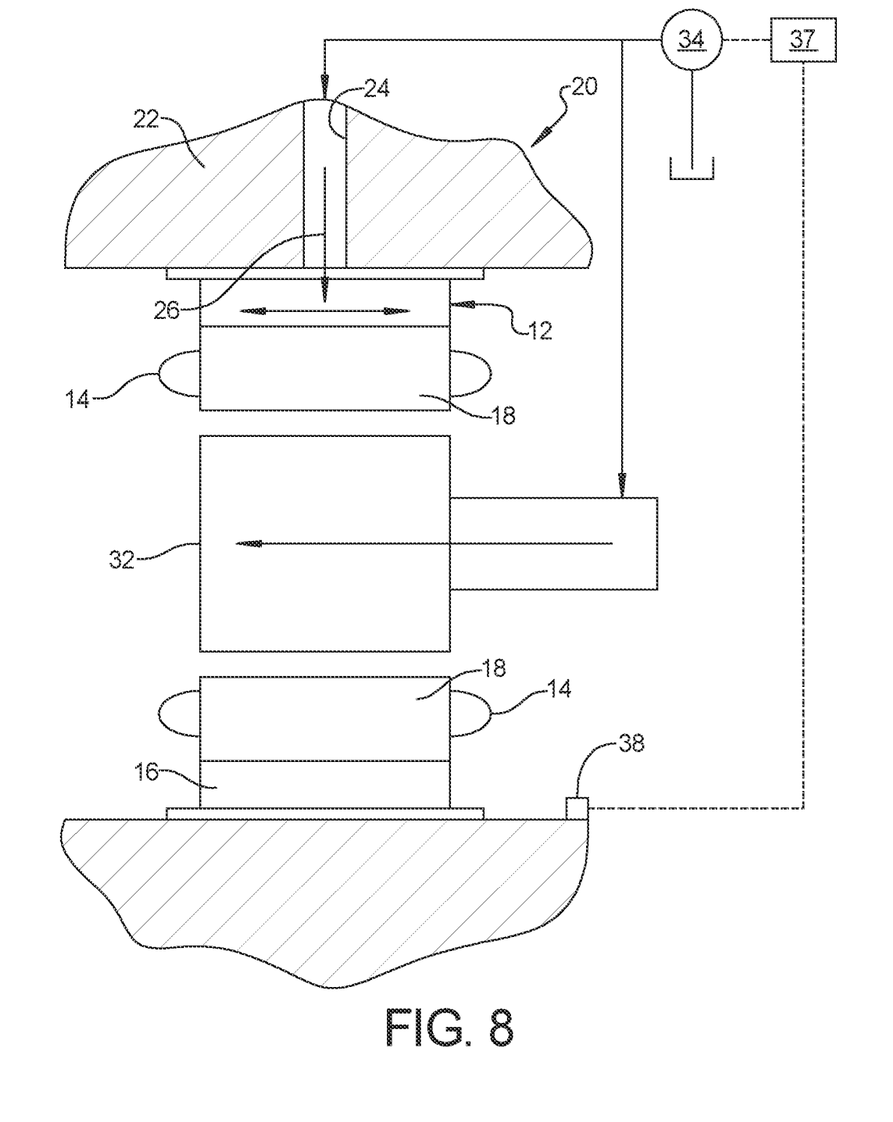
FIG. 8 is a schematic view of a motor having an oil cooled stator according to the principles of the present disclosure.

As shown in FIG. 8, the annular stator core 12 is shown implemented in a motor 20 having a housing 22 including an oil port 24 in communication with an oil inlet opening 26 for receiving oil from the oil port 24. A rotor 32 is rotatable relative to the annular stator core 12. As is known in the art, the annular stator core 12 has a plurality of coil windings 14 disposed around the stator teeth 18. A pump 34 is in communication with the oil port 24 and with oil port 36 in the rotor 32. A control unit 37 is in communication with the pump 34 and with a temperature sensor 38. The control unit 37 can control the operation of the pump 34 in response to a detected temperature of the motor 20. In particular, a passive heat pipe network 40 (described in detail herein below) can be used to cool the stator assembly 10 at low temperatures without drawings any electricity. At higher temperatures, the control unit 37 can activate the pump 34 to cool at least one of the stator 10 and the rotor 32 with an active cooling system.

Figure 2:
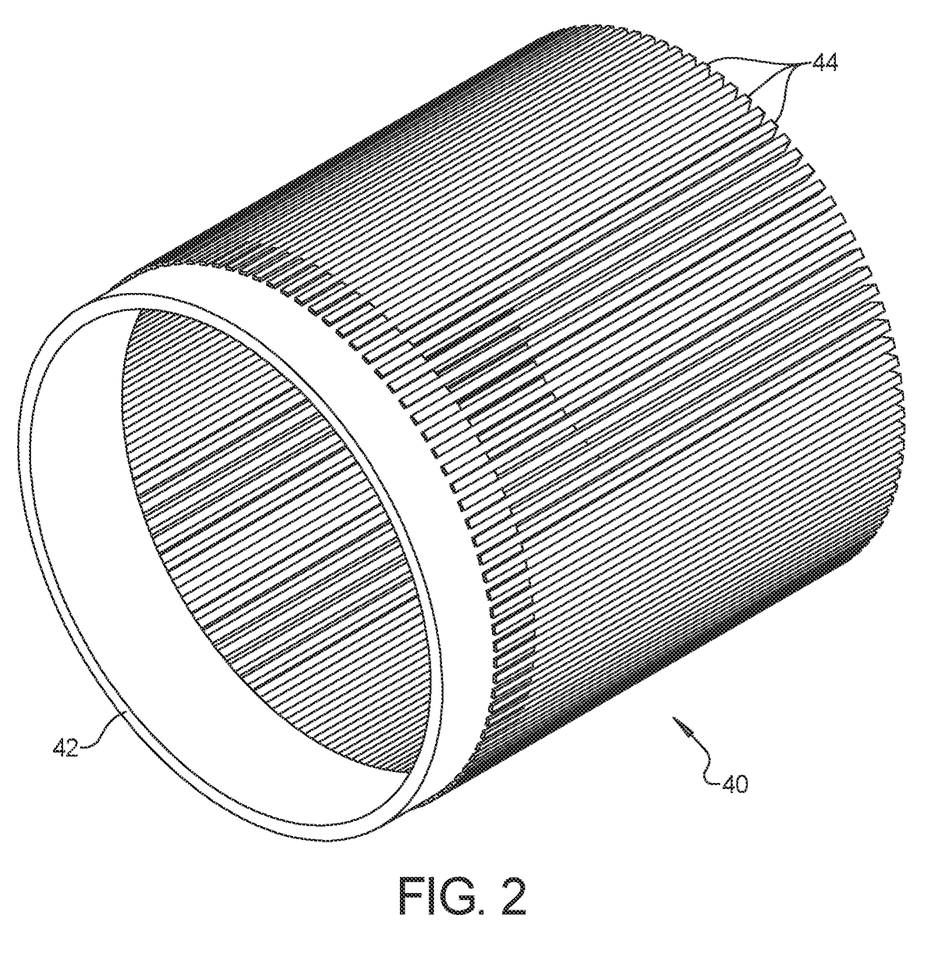
FIG. 2 is a perspective view of an embodiment of a heat pipe system for use with the stator according to the principles of the present disclosure.

With reference to FIG. 2, a heat pipe network 40 is shown for implementation with the stator 10. The heat pipe network 40 includes a condenser portion 42 that can have an annular shape and a plurality of hollow evaporator members 44 extending from the condenser portion 42. A number of the evaporator members 44 can equal a number of slots formed between the stator teeth 18 or can be less than the number of slots so that the evaporators 44 are only disposed in some of the slots.

Figure 4:
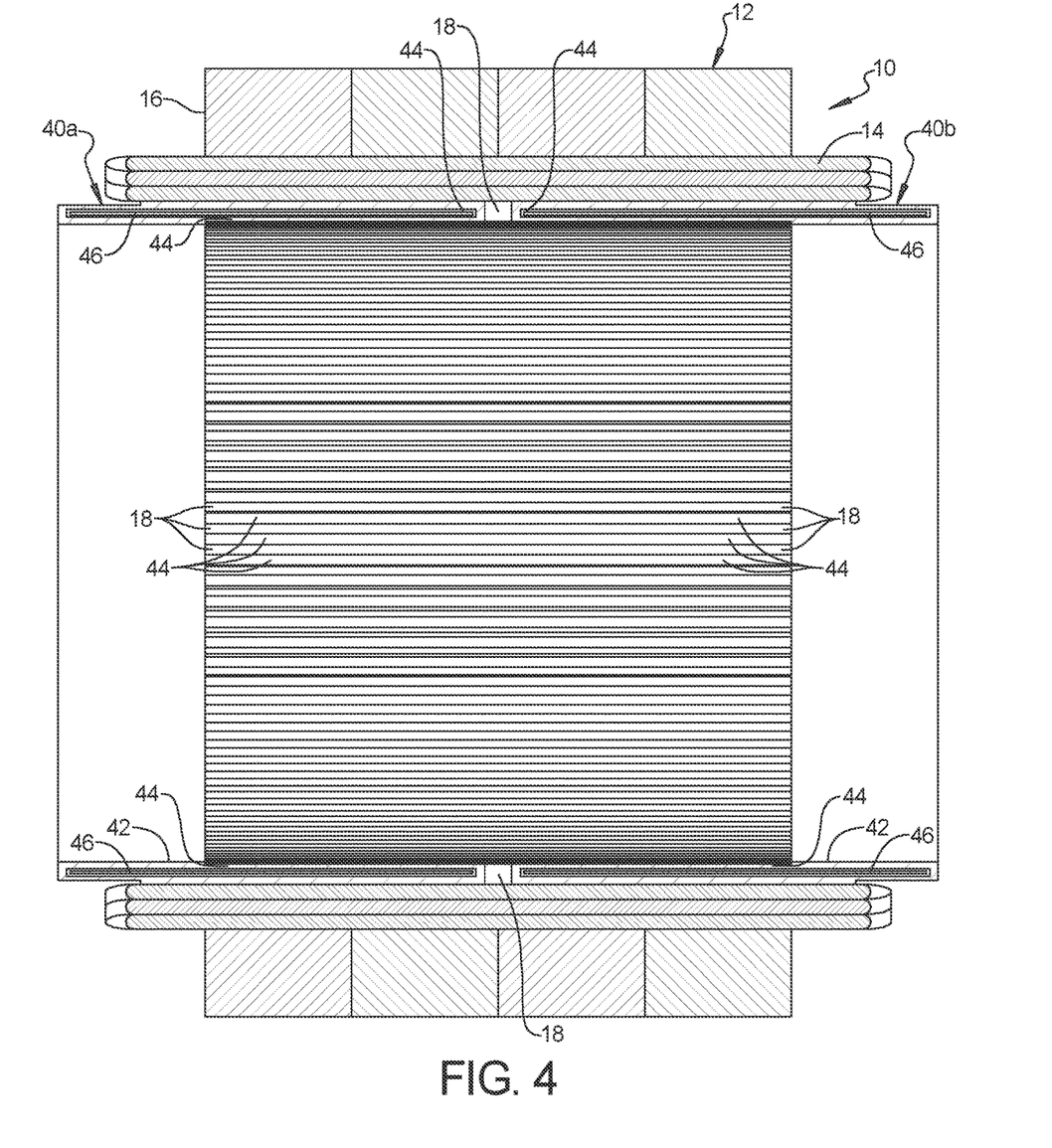
FIG. 4 is a cross-sectional view of the annular oil cooled stator with two heat pipe systems of FIG. 2 mounted therein.
Figure 5:
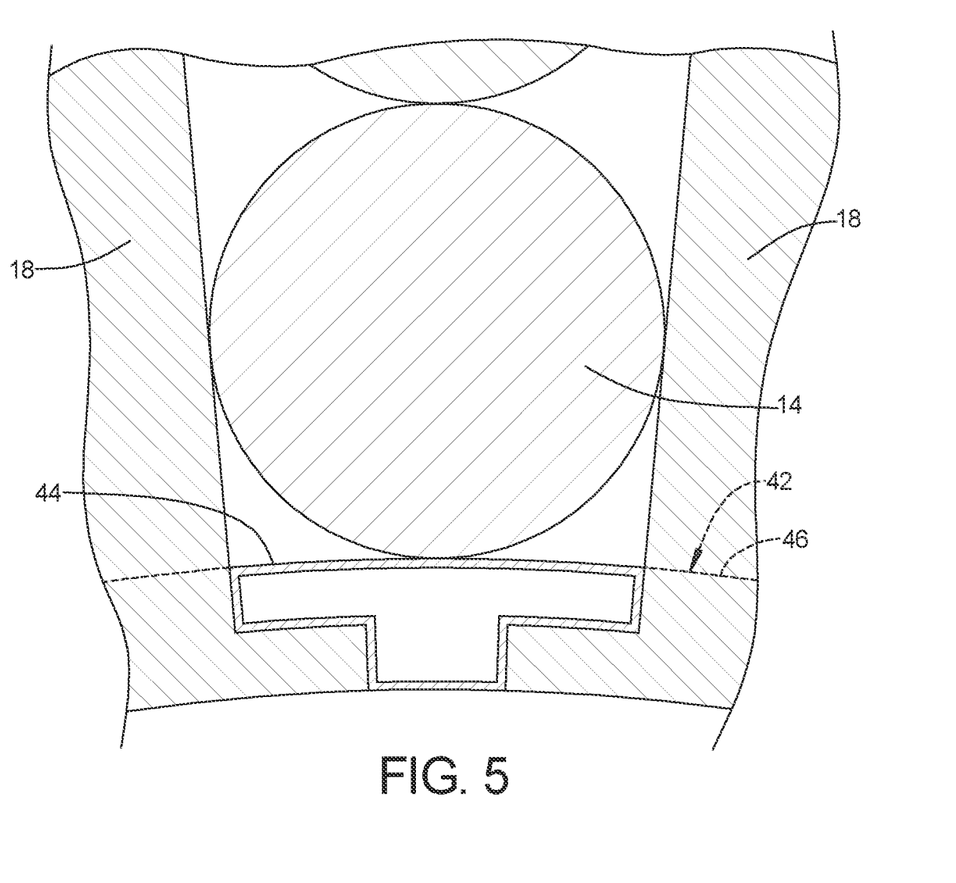
FIG. 5 is a partial cutaway view of the condenser portion and evaporator portion disposed within a slot of a stator according to the principles of the present disclosure.

As shown in FIGS. 3 and 4, the evaporator members 44 are elongated and narrow and are each configured to reside inside a respective slot formed between the stator teeth 18. The condenser portion 42 can be configured to reside in an end region of the annular stator core 12 and under an overhang of the plurality of multi-phase windings 14. As shown in FIG. 5, the evaporator members 44 each include an internal wick 46 that absorb and carry a liquid from the condenser portion 42 and along a length of the evaporator members 44. The liquid is selected to allow reliable operation over an entire range of operation temperatures.

In operation, the liquid within the evaporator members 44, which are adjacent to the windings 14 inside the stator slots, absorb the heat generated in the windings 14 and the liquid converts to a vapor phase. The vapor then expands and travels to the condenser portion 42 where it cools and condenses to a liquid phase. The liquid is then again absorbed by the internal wick and is carried back along the evaporator members 44. The condenser portion 42 is cooled via the existing oil flow from the stator manifold and/or the oil splash from the rotor cooling loop. Other cooling methods could also be used including air cooled, liquid cooled and heat sink cooled systems. The heat pipe network 40 acts as a secondary heat removal path which supplements the primary cooling system provided by the oil network or other cooling system. The location of the heat pipe evaporator members 44 inside the slot area between the teeth 18 towards the top of the slot close to the rotor airgap is beneficial. In particular, the existing copper conductors in that region generate higher electrical power losses due to higher frequency field harmonics in the airgap which penetrate to the slot region. In addition, extracting heat from the inner region is harder due to the higher thermal resistance of the inner slot area.

Due to the abundance of high-frequency leakage magnetic flux towards the slot opening, and to avoid losses incurred by the proximity effect, the evaporator members 44 can be made from ceramic. The heat pipe network 40 can be made by 3-D printing, by powder molding or by other techniques.

As shown in the schematic view of FIG. 4, two heat pipe networks 40a, 40b can be implemented, with one on each end of the annular stator core 12. In this case, the condenser portion 42 of each heat pipe network 40a, 40b can be disposed at the ends of the annular stator core 12 with the evaporator members 44 of each heat pipe network 40a, 40b extending toward each other. As shown in FIG. 5, the evaporators 44 are disposed at a top of the windings 14 and the tooth walls can be profiled to optimize heat transfer and magnetic performance.

Figure 6:
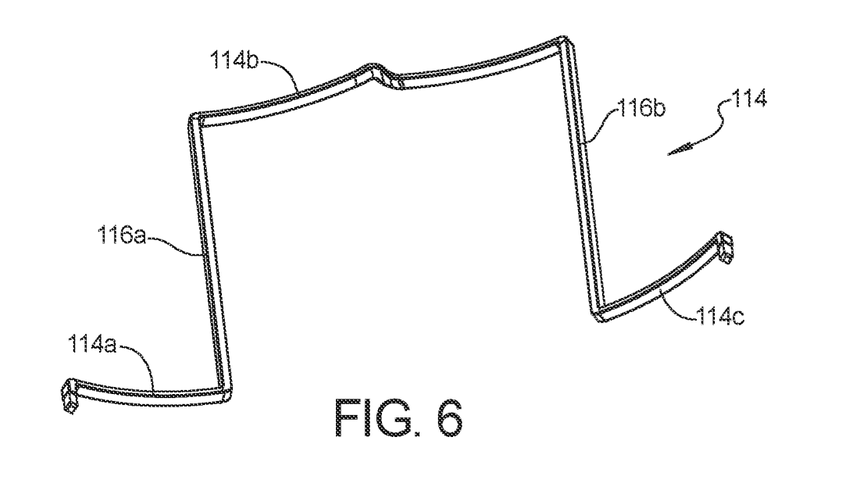
FIG. 6 is a detailed perspective view of an example hollow wire style heat pipe.
Figure 7:
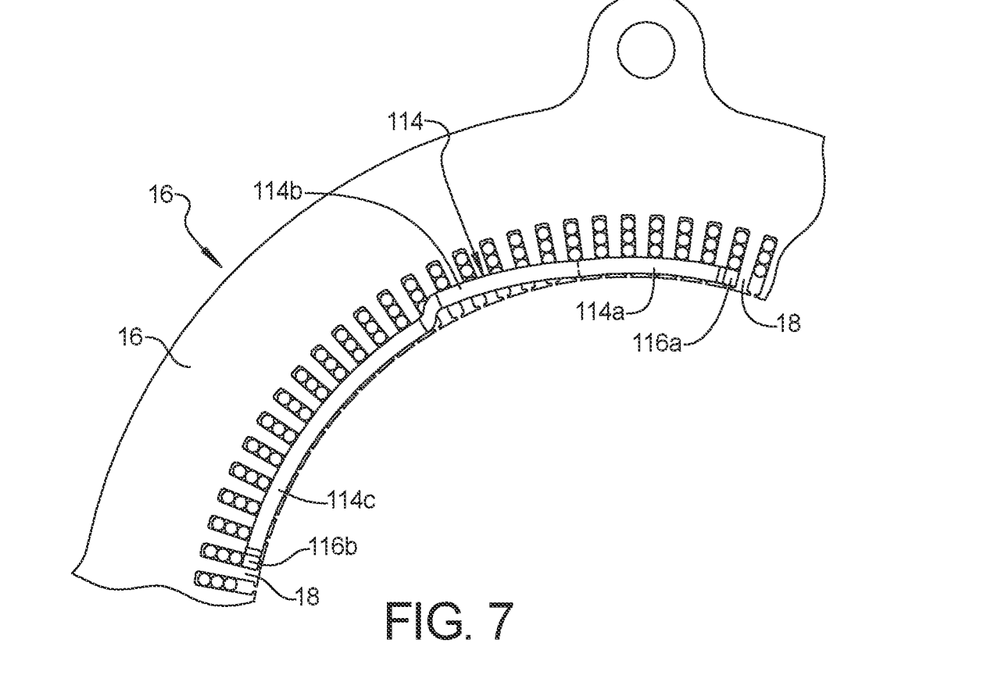
FIG. 7 is an end view of the oil cooled stator with an alternative hollow wire style heat pipe system according to a second embodiment of the present disclosure.

In an alternative embodiment as shown in FIGS. 6 and 7, the inner-most stator windings 14 can be implemented with hollow wire 114 that incorporate the heat pipe function therein. As shown in FIG. 6, the hollow wire 114 can be made from copper or other electrically conductive and flexible material. The ends of the hollow wire can be sealed, as shown in FIG. 6. A wick extends within a length of the hollow wire 114 and an amount of liquid is disposed within the hollow wire 114. As shown in FIG. 7 the stator windings 114 include end turn portions 114a, 114b, 114c that serve as condenser portions exterior to the stator slots and include slot portions 116a, 116b that are received in the stator slots and serve as evaporator portions. The hollow wire 114 can be formed by a tooling for creating the bends therein. The ends of the hollow wires 114 can extend from other layers of wire windings 14 and can be connected together by laser welding or by other known techniques.

In operation, the liquid within the slot portions/evaporator portions 116a, 116 of the hollow wires 114, absorb the heat generated within the slots and the liquid converts to a vapor phase. The vapor then expands and travels to the end turn portions/condenser portions 114a, 114b, 114c where it cools and condenses to a liquid phase. The liquid is then again absorbed by the internal wick and is carried back along the slot portions/evaporator portions 116a, 116b of the hollow wire. The end turn portions/condenser portions 114a, 114b, 114c are cooled via the existing oil flow from the stator manifold and/or the oil splash from the rotor cooling loop. The heat pipe network within the hollow wires acts as a secondary heat removal path which supplements the primary cooling system provided by the oil network while also serving as the multi-phase winding.

As described herein, any devices, electronic devices, modules, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of liquid or vapor that is of interest to the illustration.

What is claimed is:

1. A motor stator, comprising:
   a stator core having a plurality of stator teeth on an inner diameter thereof and defining a respective plurality of slots between the plurality of stator teeth;
   a plurality of windings disposed in the slots; and
   a heat pipe network including;
      a plurality of evaporator portions including a hollow structure disposed in at least a portion of the plurality of slots and including an interior having a wick extending along the interior of the hollow structure; and
      a condenser portion having an interior portion in communication with the plurality of evaporator portions and at an end of the stator core, the wick of each of the plurality of evaporator portions extending into the condenser portion, wherein the stator core includes a coolant passage therein that is connected to a pump;
   wherein the condenser portion includes a first condenser portion at one end of the stator core and a second condenser portion at a second end of the stator core and wherein the plurality of evaporator portions include a first plurality of evaporator portions extending from the first condenser portion to a longitudinal mid-region of the stator and a second plurality of evaporator portions extending from the second condenser portion to a longitudinal mid-region of the stator and separate from the first plurality of evaporator portions, wherein the plurality of windings include overhanging portions extending beyond opposite ends of the stator core and the first condenser portion and the second condenser portion are disposed radially within an overhanging portion of the plurality of windings.

2. The motor stator according to claim 1, wherein the condenser portion is annular.

3. The motor stator according to claim 1, wherein the heat pipe network is made from ceramic.

4. The motor stator according to claim 1, wherein the heat pipe network includes a liquid therein.

5. The motor stator according to claim 1, further comprising a temperature sensor associated with the stator and a control unit in communication with the temperature sensor, wherein the control unit controls operation of the pump based upon a motor temperature received from the temperature sensor.

6. The motor stator according to claim 1, wherein the plurality of evaporator portions are disposed at a top of the windings.

7. The motor stator according to claim 1, wherein the plurality of evaporator portions are elongated.

8. The motor stator according to claim 1, wherein the plurality of evaporator portions are each received in a respective one of the plurality of slots in the stator core.

9. The motor stator according to claim 1, wherein the stator core includes a plurality of stamped laminates.

10. The motor stator according to claim 9, wherein the plurality of stamped laminates are made from sheet steel.

11. The motor stator according to claim 10, wherein the plurality of stamped laminates have a thickness between 0.2 and 0.5 mm.

12. The motor stator according to claim 11, wherein the plurality of stamped laminates are secured together.

13. A motor, comprising:
   a stator including;
      a stator core having a plurality of stator teeth on an inner diameter thereof and defining a respective plurality of slots between the plurality of stator teeth;
      a plurality of windings disposed in the slots; and
      a heat pipe network including;
         a plurality of evaporator portions including a hollow structure disposed in the plurality of slots and including an interior having a wick extending along the interior of the hollow structure; and
         a condenser portion having an interior portion in communication with the plurality of evaporator portions and at an end of the stator core, the wick of each of the plurality of evaporator portions extending into the condenser portion;
      wherein the condenser portion includes a first condenser portion at one end of the stator core and a second condenser portion at a second end of the stator core and wherein the plurality of evaporator portions include a first plurality of evaporator portions extending from the first condenser portion to a longitudinal mid-region of the stator and a second plurality of evaporator portions extending from the second condenser portion to a longitudinal mid-region of the stator and separate from the first plurality of evaporator portions, wherein the plurality of windings include overhanging portions extending beyond opposite ends of the stator core and the first condenser portion and the second condenser portion are disposed radially within an overhanging portion of the plurality of windings:
- a rotor rotatably mounted relative to the stator, wherein the stator core includes a coolant passage therein that is connected to a pump;
- a temperature sensor on the stator core; and
- a control unit for actively controlling the cooling system pump when a stator temperature signal from the temperature sensor exceeds a predetermined level.

14. The motor according to claim 13, wherein the condenser portion is annular.

15. The motor according to claim 13, wherein the heat pipe network is made from ceramic.

16. The motor according to claim 13, wherein the heat pipe network includes a liquid therein.

17. The motor according to claim 13, wherein the plurality of evaporator portions are disposed at a top of the windings.

18. The motor according to claim 13, wherein the plurality of evaporator portions are elongated.

19. The motor according to claim 13, wherein the plurality of evaporator portions are each received in a respective one of the plurality of slots in the stator core.

20. A motor stator, comprising:
- a stator core having a plurality of stator teeth on an inner diameter thereof and defining a respective plurality of slots between the plurality of stator teeth;
- a plurality of windings disposed in the slots; and
- a heat pipe network including;
  - a plurality of evaporator portions including a hollow structure disposed in at least a portion of the plurality of slots and including an interior having a wick extending along the interior of the hollow structure; and
  - an annular condenser portion having an interior portion in communication with the plurality of evaporator portions and at an end of the stator core, the wick of each of the plurality of evaporator portions extending into the condenser portion, wherein the stator core includes a coolant passage therein that is connected to a pump;
- wherein the condenser portion includes a first annular condenser portion at one end of the stator core and a second annular condenser portion at a second end of the stator core and wherein the plurality of evaporator portions include a first plurality of evaporator portions extending from the first annular condenser portion to a longitudinal mid-region of the stator and a second plurality of evaporator portions extending from the second annular condenser portion to a longitudinal mid-region of the stator and separate from the first plurality of evaporator portions, wherein the plurality of windings include overhanging portions extending beyond opposite ends of the stator core and the first annular condenser portion and the second annular condenser portion are disposed radially within an overhanging portion of the plurality of windings.

* * * * *